(12) United States Patent
Baranowski et al.

(10) Patent No.: US 11,674,568 B2
(45) Date of Patent: Jun. 13, 2023

(54) METHODS AND SYSTEMS FOR A HEATABLE TENSIONING ARM

(71) Applicant: Ford Global Technologies, LLC, Dearborn, MI (US)

(72) Inventors: Thomas Baranowski, Würselen (DE); Maik Broda, Würselen (DE); Kevin John Maile, Southend on Sea (GB); Brian David Pearce, Enfield (GB)

(73) Assignee: Ford Global Technologies, LLC, Dearborn, MI (US)

( * ) Notice: Subject to any disclaimer, the term of this patent is extended or adjusted under 35 U.S.C. 154(b) by 805 days.

(21) Appl. No.: 16/659,499

(22) Filed: Oct. 21, 2019

(65) Prior Publication Data
US 2020/0124142 A1 Apr. 23, 2020

(30) Foreign Application Priority Data
Oct. 22, 2018 (DE) .......................... 102018217997.2

(51) Int. Cl.
| *F16H 7/08* | (2006.01) |
| *B60K 6/22* | (2007.10) |
| *F16H 7/18* | (2006.01) |
| *F16H 7/06* | (2006.01) |

(52) U.S. Cl.
CPC ................. *F16H 7/08* (2013.01); *B60K 6/22* (2013.01); *F16H 7/06* (2013.01); *F16H 7/18* (2013.01); *B29K 2995/0005* (2013.01); *F16H 2007/0872* (2013.01); *F16H 2007/185* (2013.01)

(58) Field of Classification Search
CPC ..... F16H 7/02; F16H 7/06; F16H 7/08; F16H 2007/0863; F16H 2007/0872; F16H 2007/0882; F16H 7/18; F16H 2007/185; F16H 2007/0893; F16H 2007/0842; F16H 2007/0823; F02B 67/00; F02B 67/04; F02B 67/06; B60K 6/22; B60K 6/26; B60K 6/28; B60Y 2200/92; B29K 2995/0005
See application file for complete search history.

(56) References Cited

U.S. PATENT DOCUMENTS

| 4,854,922 A |   | 8/1989 | Hertrich et al. |   |
|---|---|---|---|---|
| 5,690,569 A | * | 11/1997 | Ledvina .................... | F16H 7/18 474/140 |
| 6,435,994 B1 | * | 8/2002 | Friedmann ................. | F16H 9/18 474/18 |
| 6,685,854 B2 | * | 2/2004 | Memmer ............... | B01D 35/30 210/243 |

(Continued)

FOREIGN PATENT DOCUMENTS

| CN | 105570406 A | 5/2016 |  |
| WO | 2017046246 A1 | 3/2017 |  |
| WO | WO-2020068048 A1 * | 4/2020 | ............... F16H 7/18 |

*Primary Examiner* — Michael R Mansen
*Assistant Examiner* — Raveen J Dias
(74) *Attorney, Agent, or Firm* — Vincent Mastrogiacomo; McCoy Russell LLP

(57) ABSTRACT

Methods and systems are provided for a tensioning arm. In one example, the tensioning arm comprises a plurality of carbon fibers with electrically conductive fibers arranged therein configured to supply current to a pair of bushings arranged distally to one another to heat lubricant arranged proximally thereto in response to a temperature of the tensioning arm being less than or equal to a threshold temperature.

18 Claims, 3 Drawing Sheets

(56) References Cited

U.S. PATENT DOCUMENTS

| | | | | |
|---|---|---|---|---|
| 6,890,277 B2* | 5/2005 | Inoue | F16H 7/18 474/111 |
| 6,953,407 B2 | 10/2005 | Kitamura et al. | |
| 7,393,487 B2* | 7/2008 | Konno | F16H 7/18 264/250 |
| 8,308,588 B2* | 11/2012 | Hewitt | F16H 7/18 474/111 |
| 8,393,986 B2* | 3/2013 | Young | F16H 7/20 474/101 |
| 8,858,375 B2* | 10/2014 | Young | F16H 7/20 474/101 |
| 9,297,406 B2* | 3/2016 | Young | F16H 7/20 |
| 9,366,329 B2* | 6/2016 | Razzano | F16H 7/08 |
| 9,394,978 B2* | 7/2016 | Ketterl | F16H 7/18 |
| 9,777,809 B2* | 10/2017 | Hirayama | F16H 7/18 |
| 9,989,130 B2* | 6/2018 | Gomes | F16H 7/18 |
| 2002/0193192 A1* | 12/2002 | Inoue | F16H 7/18 474/140 |
| 2003/0050140 A1* | 3/2003 | Konno | F16H 7/18 474/111 |
| 2005/0200044 A1* | 9/2005 | Konno | F16H 7/18 264/250 |
| 2006/0054121 A1* | 3/2006 | Koch | F16H 7/18 123/90.17 |
| 2010/0273590 A1* | 10/2010 | Hewitt | F16H 7/18 474/111 |
| 2014/0113754 A1* | 4/2014 | Razzano | F16H 57/01 474/111 |
| 2014/0256487 A1* | 9/2014 | Ketterl | F16H 7/18 474/111 |
| 2014/0335985 A1* | 11/2014 | Wang | F16H 7/18 474/140 |
| 2016/0312863 A1 | 10/2016 | Simmons | |
| 2017/0082176 A1 | 3/2017 | Buchen et al. | |
| 2017/0321786 A1* | 11/2017 | Gomes | F16H 7/18 |
| 2019/0040937 A1* | 2/2019 | Van Ruiten | F16H 7/12 |
| 2021/0364066 A1* | 11/2021 | Kanosue | F16B 17/004 |
| 2022/0128130 A1* | 4/2022 | Mushiga | B60K 6/445 |
| 2022/0128131 A1* | 4/2022 | Schehrer | F16H 9/24 |

* cited by examiner

METHODS AND SYSTEMS FOR A HEATABLE TENSIONING ARM

CROSS REFERENCE TO RELATED APPLICATIONS

The present application claims priority to German Patent Application No. 102018217997.2, filed on Oct. 22, 2018. The entire contents of the above-listed application is hereby incorporated by reference for all purposes.

FIELD

The present description relates generally to a tensioning arm of a traction-mechanism tensioning device of a traction drive of a motor-vehicle internal combustion engine.

BACKGROUND/SUMMARY

In the field of vehicle technology, and internal combustion engines in particular, it is known to use a movement of the crankshaft of the internal combustion engine to drive other components of the internal combustion engine. Therefore, for instance, a timing chain, for example in the form of a roller chain, or a toothed belt drive, may be used to drive a camshaft of the internal combustion engine and to synchronize it with the movement of the crankshaft. Furthermore, belt drives may be used to enable ancillary units of the internal combustion engine, such as generators, cooling pumps, power steering pumps and/or climate control compressors, to be driven by the movement of the crankshaft.

The belt or chain drives in internal combustion engines may be exposed to high temperature fluctuations, which are linked to changes in length. To compensate resultant changes in the mechanical tension within the belt or the chain, which can lead in particular to a high increase in the friction and undesired wear generated thereby, it is known to use tensioning devices. Tensioning devices of this type comprise several functions including a bearing function for guiding the belt or the chain, ensure a constant mechanical tension within the belt or the chain and damp vibrations on the load side (the part not subjected to driving forces) of the belt or the chain in order to prevent noise generation and excessive wear.

Applying mechanical tension to a belt or chain drive by subjecting it to a transverse force acting transversely to the belt or the chain is also known in other fields of drive technology.

In this regard, for instance, CN 105570406 A describes a heat-power drive system, which contains two idler wheels, wherein one idler wheel is provided with a unidirectional rotating mechanism; e.g. the at least one idler wheel is a unidirectional wheel. The two idler wheels are coupled by a drive belt. The drive belt is formed by a long rubber hose. The long rubber hose is formed by a plurality of sealed, short rubber hose portions in which air is contained. A portion of the long rubber hose is arranged in a heat insulation container such that it is sheathed thereby. A high-temperature liquid is contained in the heat insulation container. The portion of the long rubber hose is in thermal contact with the high-temperature liquid so that the air in the short rubber hose portions which are located in the heat insulation container expands and the long rubber hose moves outside the heat insulation container. A movement of the long rubber hose in one direction is achieved as a result of the unidirectional rotating mechanism. A belt pulley is arranged between the idler wheels in such a way that it tensions the long rubber hose and is driven circumferentially by the movement of the long rubber hose.

To achieve a long service life, parts of the tensioning device, such as the tensioning arm for instance, are preferably produced from metal, for instance from aluminum.

Proposals for replacing metal tensioning arms in tensioning devices for belt or chain drives with tensioning arms made from plastic to reduce costs and weight are known in the previous example.

In this regard, for instance, a composite tensioning arm or guide for timing drive applications is described in U.S. 2016/0312863 A1. A body of a tensioning arm or a guide contains a plurality of layers of continuous fiber material, wherein the layers are held in a matrix made from a thermoplastic plastic material. Each layer comprises fibers which are oriented in a single direction (e.g., unidirectionally) and extend over the majority of the length or width of the material. The fibers of each of the plurality of layers are oriented in a different direction from the fibers of adjacent layers of the plurality of layers. The unidirectional band or the continuous fiber material can comprise fibers which are formed, for example, from glass or carbon fibers, in which a majority of the fibers extends in a single direction and is held in a thermoplastic substrate.

A chain sliding surface, a piston pad and a bearing hub for receiving a journal can be mounted directly on the body of the tensioning arm. The chain sliding surface, the piston head and the bearing hub can be made from a thermoplastic synthetic resin and can be molded or overmolded onto the body. The connection between the body and the chain sliding surface, the piston head and the bearing hub can take place by melt and/or chemical adhesion or by mechanical locking via locking portions in the body.

It is furthermore known to use chain or belt tensioning devices with controllable tensioning of the chain or the belt.

For example, U.S. Pat. No. 4,854,922 A discloses a tensioning device for belts, chains, and similar components, in particular for the camshaft drive of an internal combustion engine, which contains a tensioning roller mounted on a movable support and a control element with which the support can be moved by an actuating mechanism in the relaxing direction of the belt against the action of a pressure spring when the control element becomes heated. In this case, the control element has a cavity for receiving a pressurizing liquid, the volume of which varies depending on the temperature. The cavity is closed by a membrane, which is connected to the actuating mechanism. Heating of the control element takes place indirectly via the self-heating of the running internal combustion engine.

Furthermore, U.S. Pat. No. 6,953,407 B2 proposes a belt transmission device which can change a set tension of an automatic belt tensioner between a first optimal, higher value, which is suitable for starting the engine, and a second optimal value, which is suitable for driving an ancillary unit after the engine has been started. The belt transmission device contains a rotating machine belt pulley of a rotating electric machine for transmitting a starting power to the engine, an engine belt pulley for transmitting the starting power to the engine and also for transmitting a rotational power of the engine to ancillary units. Furthermore, the belt transmission device has ancillary belt pulleys, which are driven by the power of the engine belt pulley in order to drive the ancillary unit belt, which is wound around the rotating electric machine pulley, the engine belt pulley and the ancillary belt pulley. A belt tension adjuster is provided for pressing the belt in order to adjust a tension of the belt in a plurality of stages. The belt tension adjuster serves to adjust the tension of the belt in such a way that the belt tension is set to be greater when the engine is started by the rotating electric machine than when the accessory parts are driven after the engine has been started.

The automatic belt tensioner can be controlled by a heating unit. In this case, when the heating unit is activated, heat generated by a PTC ceramic heating element is transmitted to a central region of a wax chamber. As a result, the temperature of the wax and a volume of the wax increase, whereby the tension of the belt is set to a value which is suitable for starting the motor.

In the previous examples, solutions have also been proposed which are aimed at being able to better dissipate undesired heat generated by a high increase in the friction and generated thereby in order to reduce a thermal load and the risk of potential overheating of the belt or chain tensioner.

For example, WO 2017/046246 A1 proposes an accessory drive belt tensioner for use in an engine for motor vehicles, which demonstrates good damping properties, requires less damping energy and less engine power than a corresponding part made from metal, and also exhibits good long-term performance, both in terms of maintaining a low level of friction and also a high load-bearing capacity. The accessory drive belt tensioner contains a base, a tensioning arm, and a belt pulley mounted on the tensioning arm, wherein the base and the tensioning arm are arranged in a pivotal arrangement. The base and the tensioner arm are force-loaded. The pivotal arrangement delimits a space which is provided for receiving a generator belt pulley. In this case, the tensioner arm is produced from a special heat-conducting plastic compound, which contains a thermoplastic polymer, a fibrous reinforcing agent and a heat-conducting filler. Suitable fibrous reinforcing agents are glass fibers, carbon fibers and ceramic fibers. Glass fibers or carbon fibers or a combination thereof are preferred here. Carbon fibers can be used to either improve the mechanical properties or the heat-conductive properties or both. The heat-conducting filler can be present in the form of granular powder, particles, whisker, short fibers or any other suitable form. The heat-conducting filler suitably contains one or more metal fillers or metal fibers (for example aluminum, copper, magnesium, brass), inorganic heat-conducting components (for example silicon nitride, aluminum nitride, zinc oxide, mica, ceramic fibers) and carbon or carbon components (e.g. graphite, expanded graphite, carbon black, carbon fibers) and the like. When using heat-conducting fillers, which have a certain degree of electric conductivity, static charging of the drive belt can be prevented. The accessory drive belt tensioner has cooling ribs, wherein the cooling ribs are arranged in the vicinity of, or at least partially in, the space delimited by the pivotal arrangement. Furthermore, the accessary drive belt tensioner contains a bearing surface part made from metal for sliding contact with the base within the pivotal arrangement. The bearing surface part is preferably at least partially overmolded with the plastic compound.

U.S. 2017/0082176 A1 furthermore discloses a belt tensioning device for a belt drive, which enables good heat dissipation and, in particular, meets the technical requirements for use in a belt drive with a starter generator over a long useful life during which high friction powers and corresponding thermal loads on the belt tensioner can occur. The belt tensioning device has a base element, at least one tensioning arm, which is mounted to be pivotal about a pivot axis relative to the base element, a tensioning roller for tensioning the belt, a spring for resiliently supporting the tensioning arm and a connecting device for connecting the tensioning arm to the base element.

Producing the tensioning arm and/or the base element from plastic includes, in particular, the option of the base material being plastics in which elements made from a different material can be integrated. According to one exemplary embodiment, the base part and/or the tensioning arm are produced from several plastic materials, which have different material properties. In particular, the production can take place using a multi-component injection-molding method, in which different plastic materials are produced in a tool in one process. To ensure excellent heat dissipation from the bearing region, additives can be added to the base material, the heat conductivity of which is higher than that of the base material. The base material for the base element and/or the tensioning arm can be fiber-reinforced plastics, for example glass-fiber-reinforced and/or carbon-fiber-reinforced plastics.

In view of the demonstrated previous examples, the area of traction-mechanism tensioning devices of motor-vehicle internal combustion engines still desire improvements.

In one example, the issues described above may be addressed by a system comprising a tensioning arm of a traction-mechanism tensioning device of a traction drive of a motor-vehicle internal combustion engine, wherein the tensioning arm is operatively connected to the traction mechanism in an operational state for transmitting a transverse force to the traction mechanism, comprises a first thermoplastic plastic material, and comprises a fiber composite plastic, wherein the fiber composite plastic contains electrically conductive fibers and the tensioning arm has at least two mutually spaced electrically conductive connections, which are electrically connected to the electrically conductive fibers and are electrically connectable to a current source. In this way, carbon fiber tapes may be used to influence local lubricant viscosity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
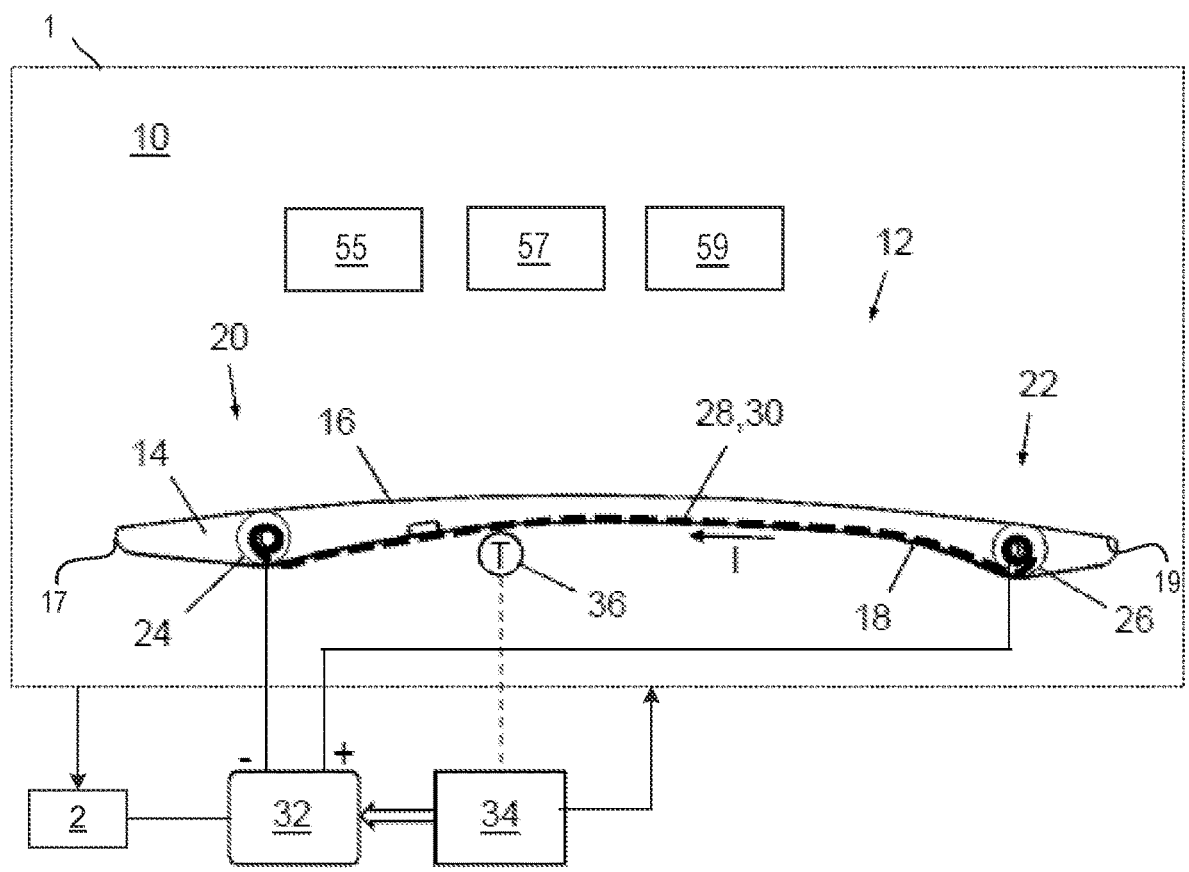
FIG. 1 shows a schematic illustration of a traction-mechanism tensioning device with a tensioning arm in a side view.
Figure 1:
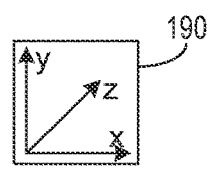
Figure 2:
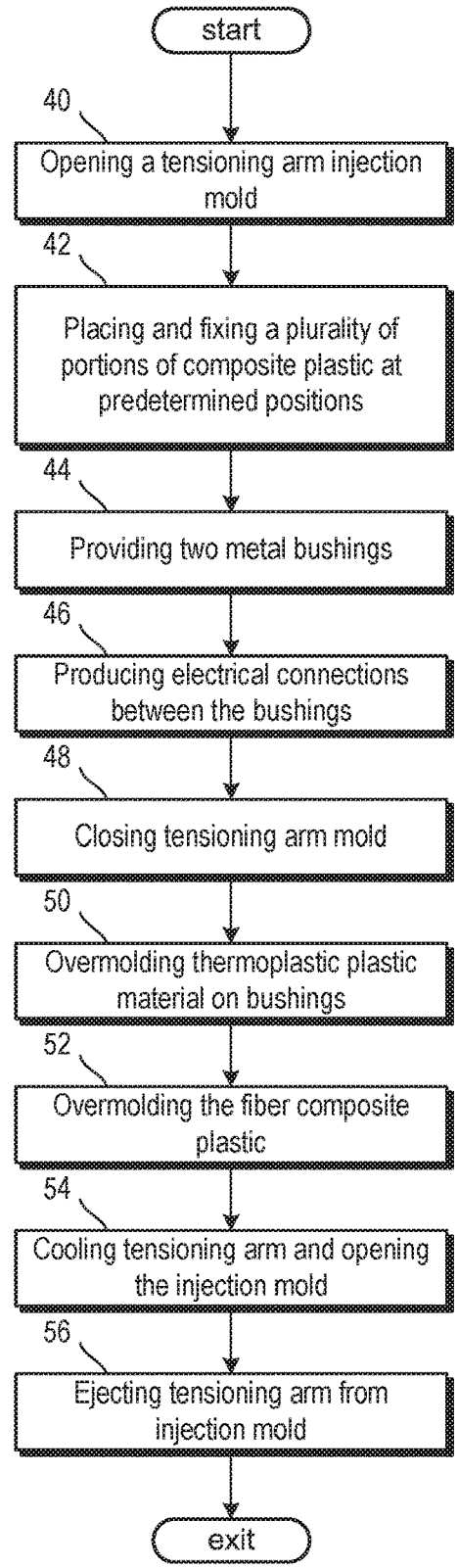
FIG. 2 shows a flow chart of a method according to the disclosure for producing a tensioning arm.
Figure 3:
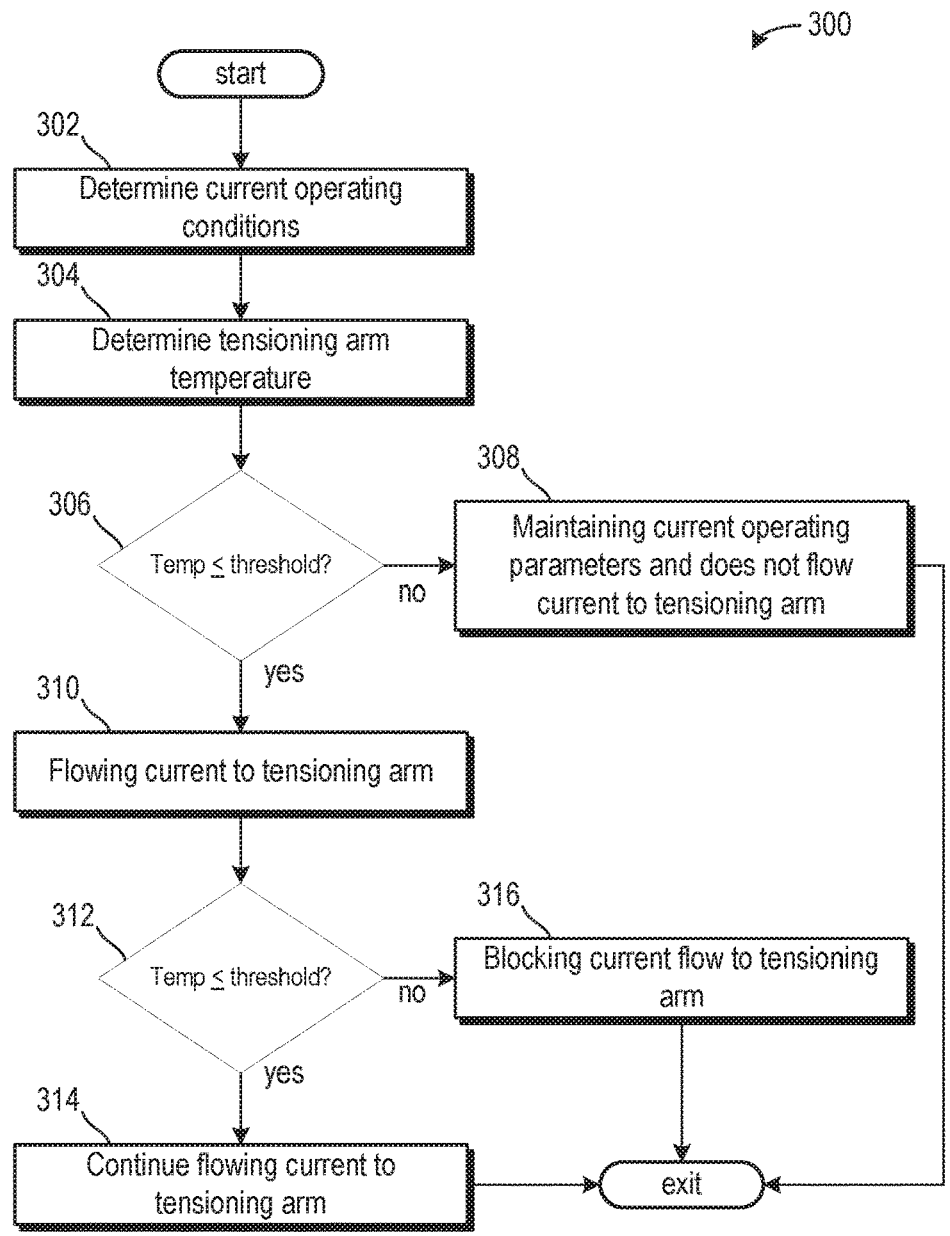
FIG. 3 shows a method for adjusting a current supply to the tensioning arm.

The following description relates to systems and methods for a tensioning arm, such as the tensioning arm illustrated in FIG. 1. The tensioning arm may be arranged in a hybrid system, as illustrated in FIG. 1. A method of manufacturing the tensioning arm is illustrated in the method of FIG. 2. A method of supplying current to the tensioning arm is illustrated in FIG. 3.

The disclosure is based on providing a tensioning arm of a tensioning device for a traction drive of a motor-vehicle internal combustion engine, which has a low self-weight, whilst possessing the desired mechanical strength and demanding as little installation space as possible, and which includes a solution for reducing or preventing significantly increased friction and a resultant undesired high degree of wear.

The tensioning arm of a traction-mechanism tensioning device of a traction drive of a motor-vehicle internal combustion engine is produced from a first thermoplastic plastic material and contains a fiber composite plastic (FCP). The tensioning arm is operatively connected to the traction mechanism in an operational state for transmitting a transverse force to said traction mechanism. In this case, the fiber composite plastic contains carbon fibers, for example, and the tensioning arm has at least two mutually spaced, electrically conductive connections which are electrically connected to the exemplary carbon fibers and are electrically connectable to a current source.

The terms "first", "second", etc. used in this application only serve for differentiation. In particular, their use is not intended to imply a sequence or priority of the objects mentioned in connection with these terms.

Within the context of this invention, "motor vehicle" is to be understood to refer in particular to a car, a truck, a semitrailer or a motor bus.

In this connection, the term "operatively connected" should be understood to mean in particular that operatively connected objects are connected to one another in such a way that transmission of a force and/or a torque between the objects is enabled. In this case, the transmission between the tensioning arm and the traction mechanism can take place both via direct contact and also, indirectly, via an intermediate element.

Within the context of the disclosure, the term "traction drive", should be understood to include in particular a belt drive, a toothed belt drive and a chain drive, in particular for controlling a camshaft or for driving ancillary units of the motor-vehicle internal combustion engine. In this case, the belt drive can have at least one belt, which is formed, for example but not restrictively, as a V-belt, cogged V-belt, or as a V-ribbed belt.

Since a mechanical load on the tensioning arm is mainly the result of bending stress, the proposed solution enables an effective increase in the mechanical strength to be achieved with a low self-weight and small installation space requirement. The tensioning arm according to the disclosure can furthermore also enable the use of plastic tensioning arms for higher mechanical loads.

Through the use of the electrically conductive fibers, for example expediently electrically conductive carbon fibers, the tensioning arm can be heated in a controlled manner, for example to a predetermined set operating temperature, after producing an electrical connection to the current source and supplying it with an electric current. As a result of the intentionally induced heating, changes in temperature, and the associated changes in length, can be substantially mitigated during operation of the internal combustion engine. Also, the change, in particular increase, in the mechanical tension of the traction mechanism brought about by possible changes in length, and a resultant potential increase in the friction and increased wear, can also be mitigated.

Furthermore, the viscosity of a lubricating oil which is used can also be reduced by the controlled heating of the tensioning arm. As a result of the reduced viscosity and blocking an increase in the friction, an increase in the fuel economy of the motor-vehicle internal combustion engine can be achieved.

In preferred embodiments of the tensioning arm, the exemplary carbon fibers are formed as unidirectionally arranged carbon fibers. A considerable increase in the mechanical bending strength of the tensioning arm can thus be achieved with very low material demands and therefore very little increase in the self-weight. Said another way, by arranging the carbon fibers in a single direction such that each of the fibers is oriented in the single direction, the tensioning arm may be manufactured with fewer materials and a reduced packaging size.

The fiber composite plastic may comprise continuous fibers (filament yarns), for example composed of carbon. The fiber composite plastic is furthermore formed in a band shape, wherein the band can be formed as a unidirectional band (UD band), as a biaxial band, or as a multiaxial band, which is produced from different types of layers and combinations of the said band types. The fiber-reinforced band can also be present as a textile band or as a multiaxial laid fabric.

The first thermoplastic plastic material contains, without being restricted thereto, at least one material from a material group which is formed by polypropylene (PP), polyamide (PA), polyoxymethylene (POM), polycarbonate (PC), and acrylonitrile butadiene styrene (ABS) and foamed versions of the said materials. For the materials of this material group which are readily available, and in large quantities, it is possible to draw on the wealth of experience and large number of application-specific manufacturing methods available.

In addition to the materials of the material group which are mentioned above, the first thermoplastic plastic material can also contain fillers, which contain, for example, talc and/or short-fiber glass fibers and/or long-fiber glass fibers, without being restricted thereto.

In some embodiments, the first thermoplastic plastic material contains at least one electrically conductive filler in a region near to the electrically conductive connections. An electrical transfer resistance of the electrical connection between each of the electrically conductive connections and the exemplary carbon fibers connected to the relevant electrically conductive connection can thus be advantageously reduced.

Examples of suitable fillers are carbon particles and short carbon fibers.

Particularly simple production of the tensioning arm can be achieved if the matrix of the fiber composite material is formed as a second thermoplastic plastic material. In a suitable configuration of the production method, the tensioning arm can be manufactured in a single process.

In preferred embodiments of the tensioning arm, the first thermoplastic plastic material and the second thermoplastic plastic material are the same material. A particularly fixed and durable connection between the fiber composite plastic and a remaining part of the tensioning arm can thus be achieved in a particularly simple manner.

The carbon fibers of the fiber composite plastic are arranged in a region of the tensioning arm which is near to the surface. A connection between the fiber composite plastic and the remaining part of the tensioning arm can thus be produced in a particularly simple manner when carrying out a suitable manufacturing method of the tensioning arm.

In some embodiments of the tensioning arm, at least one of the at least two electrically conductive connections is formed as a bushing, in particular as a metal bushing. Since the at least one bushing can be used, for example, for the pivotable mounting of the tensioning arm and, at the same time, for the electrical connection of the carbon fibers to a current source, additional component demands, and therefore costs and weight, can be kept relatively low for the tensioning arm according to the disclosure.

In a further aspect of the disclosure, a traction-mechanism tensioning device of a traction drive of a motor-vehicle internal combustion engine is proposed, which has at least one tensioning arm according to the disclosure. The traction-mechanism tensioning device furthermore contains a controllable electrical current source, the outputs of which are electrically connected to the two electrically conductive connections, at least one temperature sensor arranged in the vicinity of the tensioning arm and an electronic control unit. The electronic control unit is provided for receiving output signals of the temperature sensor and for controlling the electric current source based at least on the output signals received.

Within the context of this disclosure, the expression "provided for" should be understood in particular to mean "specifically programmed, designed or arranged for".

The advantages described in connection with the tensioning arm according to the disclosure also fully apply to a traction-mechanism tensioning device of this type. Moreover, via the traction-mechanism tensioning device, the tensioning arm and the traction mechanism can be heated to a predetermined temperature above an external temperature irrespective of an operating state of the internal combustion engine and, in particular, also at the start of a warm-up period of the internal combustion engine.

In another aspect of the disclosure, a manufacturing method for producing a tensioning arm according to the disclosure is provided. The manufacturing method comprises opening a tensioning-arm injection mold, placing and fixing a plurality of portions of a carbon-fiber-reinforced fiber composite plastic at predetermined positions in the tensioning-arm injection mold, which fiber composite plastic is formed in a band shape and contains a second thermoplastic plastic material, placing and fixing the at least two electrically conductive connections at mutually spaced positions in the tensioning-arm injection mold, producing electrical connections between each of the at least two electrically conductive connections and ends of the carbon fibers of the fiber composite material, closing the tensioning-arm injection mold, overmolding the plurality of portions of the fiber composite plastic, which are formed in a band shape, and filling the tensioning-arm injection mold with a first thermoplastic plastic material, opening the tensioning-arm injection mold after cooling the tensioning arm, and ejecting the tensioning arm from the tensioning-arm injection mold.

Within the context of the disclosure, the term "plurality" should be understood in particular to refer to a number of at least two.

The tensioning arm according to the invention can thus be produced quickly, precisely and reliably.

Methods for overmolding portions of a fiber-reinforced fiber composite plastic formed in a band shape, which portions are held in an injection mold, are known from the previous examples, in one example.

The second thermoplastic plastic material may contain a filler composed of a material whereof the heat conductivity is greater than that of the second thermoplastic plastic material. For example, the filler can comprise carbon particles and short carbon fibers. An increase in the heat conductivity of the tensioning arm can thus be advantageously achieved, which, as a result of the increased temperature conductivity, can enable a predetermined operating temperature of the tensioning arm to be achieved more quickly.

A further example of the manufacturing method contains the following additional step, which is to be implemented before the step of overmolding the plurality of portions formed in a band shape, overmolding the electrically conductive connections with a thermoplastic plastic material which contains a proportion of an electrically conductive filler.

An electrical transfer resistance of the electrical connection between each of the electrically conductive connections and the carbon fibers connected to the relevant electrically conductive connection can thus be advantageously reduced.

FIG. 1 shows a traction-mechanism tensioning device 10 with an example embodiment of a tensioning arm 12 in a side view. The tensioning arm 12 is part of the traction-mechanism tensioning device 10 of a traction drive of a motor-vehicle internal combustion engine 1, wherein the traction drive is formed by a chain drive having a chain formed as a roller chain 59 for driving a camshaft 55 of the internal combustion engine 1 via a crankshaft 57 of the internal combustion engine 1. The traction-mechanism tensioning device 10 is formed accordingly as a chain tensioning device. In an operational state, the tensioning arm 12 is operatively connected to the traction mechanism, such as the chain, in a manner known to those of ordinary skill in the art, for transmitting a transverse force to the said chain via mutual contact. The engine 1 may be an engine of a hybrid vehicle in communication with an electric motor 2. As such, each of the engine 1 and the electric motor 2 may be configured to drive a drivetrain of the hybrid vehicle.

The tensioning arm 12 has an elongated form with two planar, mutually parallel-aligned lateral surfaces 14, a convexly curved, upper contact surface 16 and a lower surface 18, which is concavely curved in one portion. The lateral surfaces 14 may comprise a first lateral surface and a second lateral surface opposite one another, wherein the first and second lateral surfaces are separated from one another via the upper surface 16 and the lower surface 18. As such, the first lateral surface may be physically coupled to first edges of the upper surface 16 and the lower surface 18 and the second lateral surface may be physically coupled to second edges, opposite the first edges, of the upper surface 16 and the lower surface 18.

Arranged in mutually spaced end regions 20, 22 of the elongated form, the tensioning arm 12 has, in each case, a bushing 24, 26 made from metal, wherein axes of symmetry of the bushings 24, 26 extend parallel to one another and are aligned perpendicularly to the lateral surfaces 14 of the tensioning arm 12. The bushings 24, 26 form through-holes in the tensioning arm 12, which correspond to fastening elements or bearing elements of the chain tensioning device so that the tensioning arm 12 can be fixedly or pivotably connected to the internal combustion engine depending on the use of the traction-mechanism tensioning device 10. Herein, the bushings 24,26 are referred to as a first bushing 24 and a second bushing 26.

An axis system 190 is shown comprising three axes including an x-axis parallel to a horizontal direction, a y-axis parallel to a vertical direction, and a z-axis perpendicular to the x- and y-axes. A thickness of the tensioning arm 12 may be measured along the y-axis and a length of the tensioning arm 12 may be measured along the x-axis. The tensioning arm 12 may be thickest at its first and second end regions 20, 22, wherein the tensioning arm 12 is thinnest along a middle portion between the first and second end regions 20, 22. In one example, a thickest region of the tensioning arm 12 corresponds to the locations of the first bushing 24 and the second bushing 26.

In one example, the top surface 16 of the tensioning arm 12 comprises a single curve with a highest point relative to the y-axis being located along its middle relative to the first and second end regions 20, 22. The bottom surface 18 may comprise a plurality of curves, wherein the bottom surface 18 curves away from the top surface 16 from a first extreme end 17 to a location of the first bushing 24. From the first bushing 24 to the second bushing 26, which may be herein referred to as a middle region of the tensioning arm 12, the bottom surface 18 curves toward the top surface 16 such that a distance between the top surface 16 and the bottom surface 18 decreases. In one example, the curve of the bottom surface 18 along the middle region is more extreme than the curve of the top surface 16. At the second end region 22, the bottom surface 18 curves away from the top surface 16, similar to the curve at the first end region 20, from the second bushing 26 to a second extreme end 19.

The tensioning arm 12 is produced from a first thermoplastic plastic material, which is formed from polyamide (PA), for example. In a region of the lower surface 18 of the tensioning arm 12 which is near to the surface, and arranged parallel to this surface, the tensioning arm 12 contains a layer of a fiber composite plastic (FCP) 28, which contains carbon fibers 30 which are formed as continuous fibers and are received by a matrix made from a thermoplastic plastic material. The second thermoplastic plastic material is likewise formed from polyamide (PA), for example, so that, in this specific embodiment, the first thermoplastic plastic material and the second thermoplastic plastic material are formed from the same material.

In a region around the bushings 24, 26 of the tensioning arm 12, the first thermoplastic plastic material contains an additional, electrically conductive filler, which is formed by a mix of short-fiber carbon fibers and carbon particles.

The carbon fibers 30 are arranged unidirectionally in the fiber composite plastic 28, specifically in a direction (I) which extends substantially parallel to the lower surface 18 and perpendicularly to the lateral surfaces 14 of the tensioning arm 12. In one example, the carbon fibers 30 are arranged proximally to an interface between a lateral surface and an edge of the bottom surface 18. In one example, additionally or alternatively, the carbon fibers 30 may be arranged along the bottom surface 18 distal to its edges and the lateral surfaces 14.

The two bushings 24, 26 of the tensioning arm 12 are electrically connected to the carbon fibers 30. In this case, the electrical connection is promoted by the presence of the electrically conductive filler. The two bushings 24, 26 serve as electrically conductive connections and are electrically connected to a controllable current source 32 arranged in the interior of the motor vehicle. In one example, the controllable current source 32 is a battery. The battery 32 may be in communication with the electric motor 2.

The carbon fibers 30 are electrically connected to the current source 32 of the traction-mechanism tensioning device 10 via the two bushings 24, 26 of the tensioning arm 12 and can be acted upon by an electric current I via the current source 32, which current, upon activation of the current source 32, generates Joule heat in the carbon fibers 30 owing to the electrical resistance thereof. As a result of the heat generated, a temperature of the tensioning arm 12 and the traction mechanism (e.g., the chain) located in mutual contact with the tensioning arm 12 can be increased in relation to an external temperature.

The traction-mechanism tensioning device 10 furthermore has an electronic control unit 34, which is provided for controlling the current source 32 and, to this end, is data-connected to the current source 32. The electronic control unit 34, the controllable current source 32, the carbon fibers 30 of the fiber composite plastic 28 and a temperature sensor 36, which is arranged in the vicinity of the tensioning arm 12 and whereof the output signals can be received by the electronic control unit 34, form a control path via which the tensioning arm 12 and the chain can be heated to a predetermined temperature above an external temperature irrespective of an operating state of the internal combustion engine and in particular also at the start of a warm-up period of the internal combustion engine.

A manufacturing method for producing a tensioning arm 12 according to FIG. 1 will be described below with reference to FIGS. 1 and 2. A flow chart of the manufacturing method according to the disclosure is illustrated in FIG. 2.

The method begins at 40, which includes opening a tensioning-arm injection mold. The method proceeds to 42, which includes placing and fixing a plurality of portions of a carbon-fiber-reinforced fiber composite plastic 28, formed in a band shape, at predetermined positions in the tensioning-arm injection mold. The fiber composite plastic 28 contains a second thermoplastic plastic material as a matrix, in which unidirectional carbon fibers 30 formed as continuous fibers are embedded, wherein the second thermoplastic plastic material is formed from polyamide.

The method proceeds to 44, which includes providing two metal bushings 24, 26, which are additionally provided as electrically conductive connections, are placed and fixed at mutually spaced positions in the tensioning-arm injection mold. The method proceeds to 46, which includes producing electrical connections between each of the two electrically conductive connections 24, 26 and ends of the carbon fibers 30 of the fiber composite material 28. The method proceeds to 48, which includes closing the tensioning-arm injection mold.

The method proceeds to 50, which includes overmolding the electrically conductive connections 24, 26 with a thermoplastic plastic material, which thermoplastic plastic material contains polyamide with a proportion of an electrically conductive filler made from a mixture of short-fiber carbon fibers and carbon particles.

The method proceeds to 52, which includes overmolding the plurality of portions of the fiber composite plastic 28, which are formed in a band shape, with a first thermoplastic plastic material made from polyamide and the tensioning-arm injection mold is filled with the thermoplastic plastic material.

The method proceeds to 54, which includes cooling the manufactured tensioning arm and opening the tensioning-arm injection mold. The method proceeds to 56, which includes ejecting the manufactured tensioning arm 12 is ejected from the tensioning-arm injection mold.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 3, it shows a method 300 for supplying current to the tensioning arm, such as tensioning arm 12 of FIG. 1. Instructions for carrying out method 300 may be executed by a controller (e.g., controller 34) based on instructions stored on a memory of the controller and in conjunction with signals received from sensors of the engine system, such as the sensors described above with reference to FIG. 1 (e.g., temperature sensor 36). The controller may employ engine actuators of the engine system to adjust engine operation, according to the method described below.

The method 300 begins at 302, which includes determining current operating conditions. Current operating conditions may include throttle position, vehicle speed, engine speed, engine temperature, ambient temperature, and air/fuel ratio.

The method 300 proceeds to 304, which includes determining a tensioning arm temperature. In one example, the tensioning arm temperature is determined via feedback from a temperature sensor coupled to the tensioning arm. Additionally or alternatively, the tensioning arm temperature may be calculated via one or more inputs including engine speed, lubricant temperature, and ambient temperature.

The method 300 proceeds to 306, which includes determining if the tensioning arm temperature is less than or equal to a threshold temperature, wherein the threshold temperature is based on a cold-start temperature. Additionally or alternatively, the threshold temperature may be based on a temperature of the tensioning arm corresponding to a lubricant viscosity being greater than a desired viscosity. At any rate, if the tensioning arm temperature is greater than the threshold temperature, then the method 300 proceeds to 308, which includes maintaining current operating parameters and does not flow current to the tensioning arm.

If the tensioning arm temperature is less than or equal to the threshold temperature, then the method 300 proceeds to 310, which includes flowing current to the tensioning arm. As such, the battery may be signal to flow current electrically conductive fibers arranged with the carbon fibers on the tensioning arm, which may energize the bushings arranged at opposite ends of the tensioning arms. By doing this, lubricant proximal to the bushings may be heated, thereby decreasing a viscosity of the bushings. The tensioning arm may also be heated during this process. In one example, the tensioning arm is heated via a positive thermal coefficient material, wherein the electrically conductive fibers deliver current to the positive thermal coefficient material.

The method 300 proceeds to 312, which includes determining if the tensioning arm temperature is less than or equal to the threshold temperature. If the tensioning arm temperature is still less than or equal to the threshold temperature, then the method 300 proceeds to 314, which includes continuing to flow current to the tensioning arm. If the tensioning arm temperature is now greater than the threshold temperature, then the method 300 proceeds to 316, which includes blocking and/or stopping current flow to the tensioning arm. It will be appreciated that the battery may continue to deliver current to other components of the hybrid vehicle.

In this way, a chain tensioner arm may be reinforced via unidirectional carbon fiber tapes. Mechanical properties of a plastic chain tensioner arm may be increased while decreasing a packaging size thereof, enabling the plastic chain tensioner arm to achieve a smaller size and increased durability to that of similar metal tensioner arms at a fraction of the cost. The unidirectional carbon fiber tapes may further allow a heating of lubricant local to the bushings of the arms via a voltage applied to the two bushings. The technical effect of controlling heating of the chain tensioner arm and heating the lubricant at the bushings is to reduce friction and increase fuel economy. By doing this, unidirectional carbon fiber tapes may be used in a chain tensioner arm to influence local oil viscosity and to reinforce the plastic material of the chain tensioner arm.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a tensioning arm of a traction-mechanism tensioning device of a traction drive of a motor-vehicle internal combustion engine, wherein the tensioning arm is operatively connected to the traction-mechanism tensioning device in an operational state for transmitting a transverse force to the tensioning device, comprises a first thermoplastic plastic material, and comprises a fiber composite plastic, wherein the fiber composite plastic contains electrically conductive fibers and the tensioning arm has at least two mutually spaced electrically conductive connections, which are electrically connected to the electrically conductive fibers and are electrically connectable to a current source.

2. The system of claim 1, wherein the electrically conductive fibers are unidirectionally arranged carbon fibers.

3. The system of claim 1, wherein the first thermoplastic plastic material comprises at least one electrically conductive filler in a region near to the electrically conductive connections.

4. The system of claim 1, wherein a matrix of the fiber composite plastic is a second thermoplastic plastic material.

5. The system of claim 4, wherein the first thermoplastic plastic material and the second thermoplastic plastic material are the same material.

6. The system of claim 1, wherein the electrically conductive fibers of the fiber composite plastic are arranged in a region of the tensioning arm near an outer surface.

7. The system of claim 6, wherein the outer surface is a bottom surface of the tensioning arm.

8. The system of claim 1, wherein at least one of the at least two electrically conductive connections is a bushing.

9. The system of claim 1, wherein the current source is a battery, and wherein the battery is arranged in a hybrid vehicle.

10. The system of claim 1, further comprising a controller with instructions stored on non-transitory memory thereof that, when executed, enable the controller to adjust an operation of the current source in response to a feedback from a temperature sensor.

11. The system of claim 10, wherein the instructions further enable the controller to activate the current source in response to the feedback indicating a temperature of the tensioning arm being less than or equal to a threshold temperature, and wherein the threshold temperature is based on a cold-start.

12. The system of claim 11, wherein the instructions further enable the controller to deactivate the current source in response to the feedback indicating the temperature of the tensioning arm being greater than the threshold temperature.

13. A hybrid system, comprising:
an engine, an electric motor, and a battery;
a roller chain configured to drive a camshaft via motion of a crankshaft;
a tensioning arm configured to tension the roller chain, the tensioning arm comprising a first bushing arranged at a first end of the tensioning arm and a second busing arranged at a second end opposite the first end; and
a plurality of carbon fiber tapes configured to electrically couple the first bushing to the second bushing via electrically conductive fibers located in the plurality of carbon fiber tapes.

14. The hybrid system of claim 13, further comprising a controller with computer-readable instructions stored on non-transitory memory thereof that when executed enable the controller to activate the battery to deliver current to the first and second bushings via the electrically conductive fibers in response to a temperature of the tensioning arm being less than or equal to a threshold temperature, wherein the temperature of the tensioning arm is sensed via a temperature sensor.

15. The hybrid system of claim 14, wherein the computer-readable instructions further enable the controller to block the battery from delivering current to the first and second busing in response to the temperature of the tensioning arm being greater than the threshold temperature.

16. The hybrid system of claim 13, wherein the first bushing and the second bushing heat are configured to heat a lubricant when the electrically conductive fibers receive a current from the battery.

17. The hybrid system of claim 13, wherein the tensioning arm comprises a plastic, wherein the plastic is one or more of a polypropylene, polyamide, polyoxymethylene, and a mix of polycarbonate and acrylonitrile butadiene styrene.

18. The hybrid system of claim 13, wherein the plurality of carbon fiber tapes includes one or more of unidirectional tapes, bi-axial tapes, and multi-axial tapes.

* * * * *